United States Patent [19]
Lindner

[11] Patent Number: 5,832,944
[45] Date of Patent: Nov. 10, 1998

[54] VALVE FOR A STEAM TURBINE AND METHOD OF ACTUATING THE VALVE

[75] Inventor: Rudolf Lindner, Nuremburg, Germany

[73] Assignee: ABB Patent GmbH, Mannheim, Germany

[21] Appl. No.: 578,476

[22] Filed: Dec. 26, 1995

[30] Foreign Application Priority Data

Dec. 24, 1994 [DE] Germany ................. P 44 46 605.6

[51] Int. Cl.⁶ .................................................. F16K 31/04
[52] U.S. Cl. .............................. 137/1; 137/597; 137/605; 251/129.11; 251/30.02
[58] Field of Search .............................. 251/129.11, 30.02, 251/30.01, 25, 71, 30.05, 69; 137/597, 605, 606, 1

[56] References Cited

U.S. PATENT DOCUMENTS

| | | | |
|---|---|---|---|
| 3,768,776 | 10/1973 | Staslicka | 251/231 |
| 3,808,895 | 5/1974 | Fitzwater | 251/69 X |
| 4,007,906 | 2/1977 | Karpenko | 251/30.02 X |
| 4,257,234 | 3/1981 | Trassi et al. | 137/362 X |
| 4,873,957 | 10/1989 | Ueyama et al. | 251/129.11 X |
| 4,936,541 | 6/1990 | Oksanen et al. | 251/30.05 X |
| 4,997,069 | 3/1991 | Strache | 251/71 X |
| 5,333,989 | 8/1994 | Missana et al. | 251/129.11 X |

*Primary Examiner*—Kevin Lee
*Attorney, Agent, or Firm*—Herbert L. Lerner; Laurence A. Greenberg

[57] ABSTRACT

A valve for a steam turbine includes a valve housing having a sealing seat disposed therein which interacts with a sealing piece, a valve spindle for actuating the sealing piece, and a drive for actuating the valve spindle. The drive includes an electric motor which interacts with the valve spindle through an electromagnetically actuated coupling and acts upon an energy accumulator. A method is also provided for actuating the valve.

16 Claims, 3 Drawing Sheets

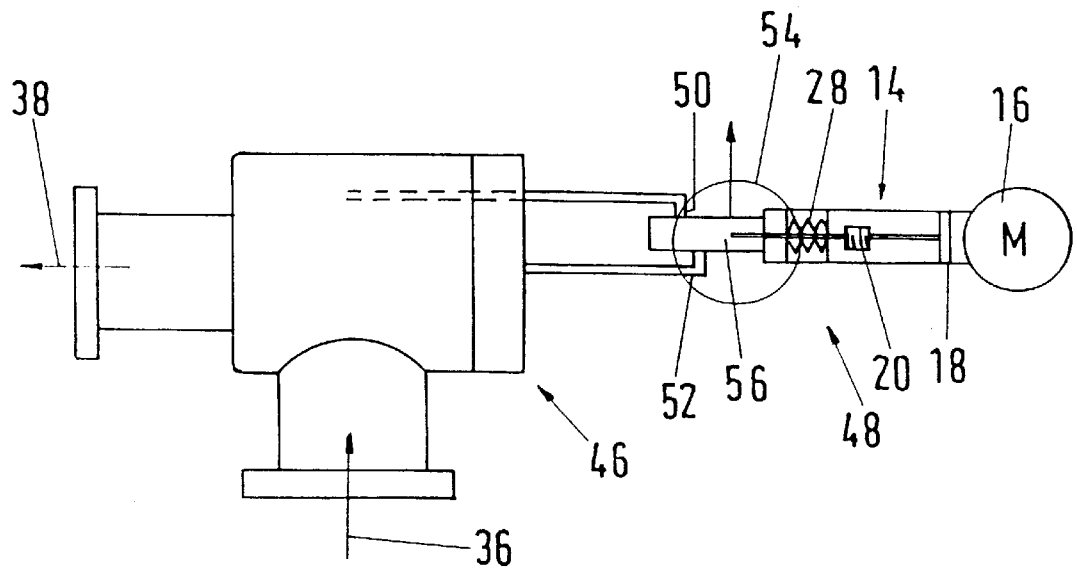
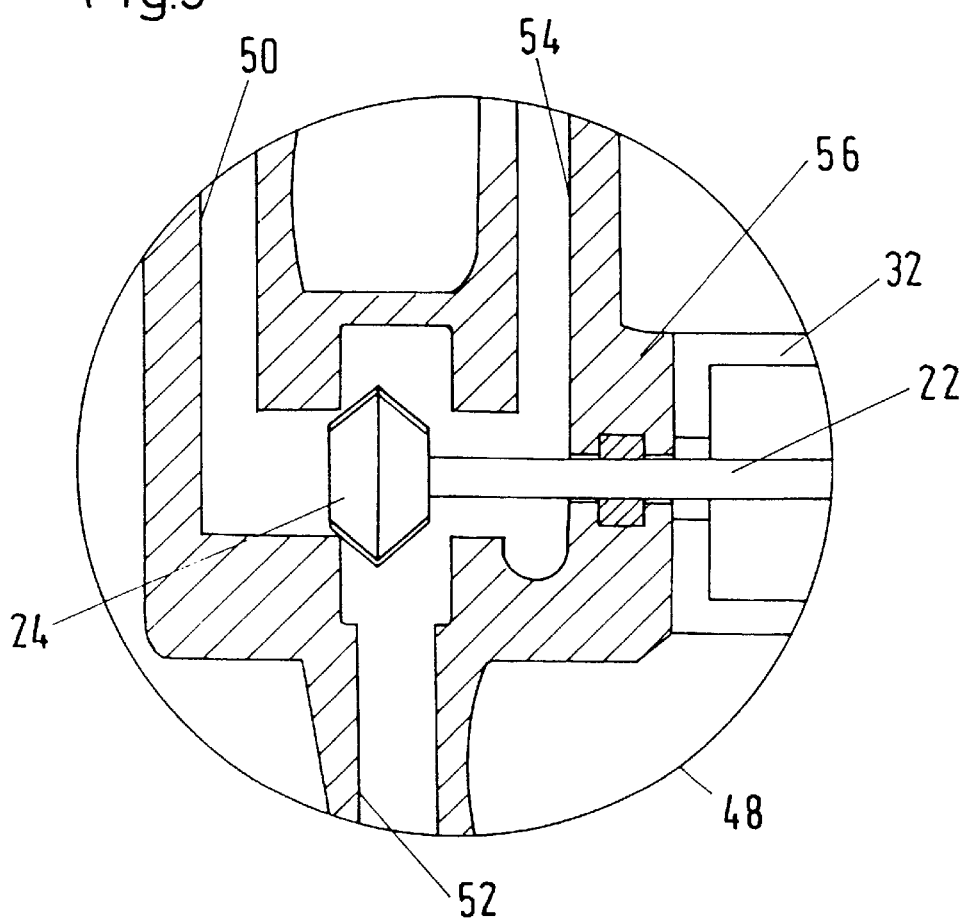

VALVE FOR A STEAM TURBINE AND METHOD OF ACTUATING THE VALVE

BACKGROUND OF THE INVENTION

FIELD OF THE INVENTION

The invention relates to a valve for a steam turbine, including a valve housing having a sealing seat disposed therein for interacting with a sealing piece, a valve spindle for actuating the sealing piece, and a drive for actuating the valve spindle. The invention also relates to a method of actuating the valve as a pilot valve for a turbine emergency-stop valve or as a turbine governing valve.

Valves for steam turbines are generally used as so-called emergency-stop valves and as turbine governing valves, wherein hydraulic actuating drives are generally provided in order to guarantee requisite actuating forces, actuating speed and positioning accuracy. In such a turbine valve structure, an oil-operated governing and control system is imperative, as are pressure and return lines for connecting the respective turbine valve to an oil-operated governing and control system as well as corresponding actuating cylinders and piston-rod leadthroughs for actuating the valves.

Apart from the not inconsiderable expense in terms of equipment, as well as the extensive control in that respect, and the requisite monitoring and maintenance, beyond that there is additionally a fire risk if oil is used as hydraulic fluid. In order to reduce the fire hazard as well as the expense of pipework at the turbine, so-called compact drives have already been put into practice here and there in very large units. However, that solution is not suitable for small and medium-sized turbine plants for various reasons, not the least of which is cost.

Pneumatic drives for actuating turbine valves have also been used here and there, but difficulties in operation have appeared which can be attributed to the discontinuous behavior of the valve forces, especially in larger valves.

Electrical signals from electric or electronic turbine governing and protective equipment are mainly used to activate the drives described above, so that corresponding coupling links between the electrical system on one hand and the hydraulic or pneumatic system on the other hand are imperative.

SUMMARY OF THE INVENTION

It is accordingly an object of the invention to provide a valve for a steam turbine and a method of actuating the valve, which overcome the hereinafore-mentioned disadvantages of the heretofore-known devices and methods of this general type, in which coupling links can be dispensed with and in which plant and process requirements, for example a turbine emergency stop, are reliably maintained at the same time.

With the foregoing and other objects in view there is provided, in accordance with the invention, a valve for a steam turbine, comprising a valve housing having a sealing seat disposed therein; a sealing piece interacting with the sealing seat; a valve spindle for actuating the sealing piece; and a drive for actuating the valve spindle, the drive including an energy accumulator, an electromagnetically actuated coupling, and an electric motor interacting with the valve spindle through the electromagnetic coupling and acting upon the energy accumulator.

Thus the decisive step towards "fully electrical" control and governing as well as fault protection of a steam turbine has been taken.

In accordance with another feature of the invention, the electromagnetic coupling is connected to a threaded bush which interacts with the valve spindle, that is guided in a rotationally locked manner, and thus axially moves the latter.

In accordance with a further feature of the invention, the threaded bush is a ballscrew bush and acts upon the valve spindle with little play or friction. Since, as mentioned, the valve spindle is guided in a rotationally locked manner, that is it can only be moved up and down axially when the threaded bush is rotating, no translationally effective drive is required, but the electric motor provided according to the invention suffices as a drive, which can be activated in both directions of rotation. The electric drive motor is of course provided with torque protection so that in this way, when, for example, the valve is being closed, the sealing piece, for example a valve cone adjoining the valve spindle at one end, is prevented from sustaining damage when bearing against the sealing seat associated with it, and from damaging this sealing seat.

In accordance with an added feature of the invention, the energy accumulator is a spring accumulator which is preferably formed through the use of disc springs and serves if need be to bring about the quick closing of the valve by a rotary restraint applied by the electric drive motor through the electromagnetic coupling, being neutralized as a result of the de-energizing of the electromagnetic coupling and by the spindle together with the sealing piece disposed thereon being loaded in axial movement against the sealing seat.

The spring-accumulator configuration according to the invention is provided in such a way that, when the valve spindle is actuated by the electric drive motor, that is when the electromagnetic coupling is energized, the threaded bush connected thereto rotates and in the process axially moves the valve spindle in engagement with it. At the same time as this axial movement occurs, the energy accumulator is charged by its energy-storing elements, for example disc springs, being compressed. As soon as the prevailing operating conditions require initiation of the turbine emergency stop, it is sufficient to de-energize the electromagnetic coupling, that is to make it dead, in order to bring about the immediate closing of the valve through the relaxing of the energy accumulator.

The actuating speed of the electric-motor drive corresponds to the geometric conditions of the thread of the threaded bush or the valve spindle in engagement with it in combination with the requisite valve stroke as well as the motor speed. For these reasons, the normal actuating speed is limited. It is on no account sufficient for special operational cases such as emergency stop, full-load disconnection or disconnection for auxiliary service. The combination of energy accumulator and electromagnetic coupling is provided for such extreme requirements with regard to closing speed. In this case, the threaded bush connected to the electromagnetic coupling is set in rotation, while the valve spindle engaging therein is axially loaded with the sealing piece against the associated sealing seat.

In accordance with still another feature of the invention, in order to ensure that any braking effects as a result of friction can be kept down in this case as far as possible, the threaded bush is guided in rolling bearings.

Furthermore, provision is made to construct the thread, serving to load the valve spindle, as a ballscrew. In this way, the friction at the thread surfaces present between the valve spindle and the threaded bush is greatly minimized and at the same time close play is maintained.

In accordance with an additional feature of the invention, the valve is used as a so-called pilot-control valve for medium-actuated turbine emergency-stop valves. In this case, the so-called pilot-control valve differs from the embodiments described above merely by the valve housing being constructed as a 3-way valve having a sealing piece which moves out of a working position into a rest position when the electromagnetic coupling is de-energized, as a result of the loading by the energy accumulator acting through the valve spindle, and thus clears the flow path for the working medium for acting upon the closing member of the main valve, so that the main valve is brought into the closed position and held there by its own working medium, whereas in normal operation the working medium fed to the pilot-control valve is fed to a low-pressure space through the pilot-control valve.

In this refinement too, the combination of energy accumulator and electromagnetic coupling comes to bear, which ensures that, as in the variants of the invention described above as well, even if the electric supply fails, the quick closing of the relevant turbine valve, which quick closing is required in particular for an operating state of this type, is reliably ensured.

On the other hand, the comparatively slow actuating speed which is applied to the valve spindle by the motor through the threaded bush is of secondary importance for the opening action, since the opening times which can be achieved in this case are completely sufficient. This correspondingly applies to the approach of defined intermediate positions, for example for preheating and test purposes.

In accordance with yet another feature of the invention, the valve is used as a governing valve. However, use as a governing valve requires more than just an increase in the closing speed. On the contrary, it is necessary with regard to the desired turbine governing to specifically load the individual nozzle groups so that a governing valve is respectively provided for nearly every nozzle group and an additional governing valve is used for the basic governing.

It is not desirable in every case to interrupt the steam feed to the turbine completely, that is to close all governing valves. During a so-called partial-load release, for example, it is necessary to distribute the steam mass flow over a plurality of valves or valve groups and to obtain the requisite rates of change of the steam mass flow in both the closing direction and the opening direction of the valves by feed-forward control or by the use of selection logic and deviation-dependent reversals.

In accordance with yet a further feature of the invention, wherein the valve is provided for use as a governing valve and is combined with at least one further valve of the same type, the electric drive motor as well as the electromagnetic coupling of each valve are connected to a common electric or electronic governing device which accordingly converts the operationally dependent parameters.

In accordance with yet an added feature of the invention, there are provided at least five valves of the same type, of which one is used for the basic governing and the other valves are respectively allocated to a nozzle group of the steam turbine as load valves.

In accordance with yet an additional feature of the invention, each of the electromagnetic couplings is de-energized upon initiation of the turbine emergency stop and each sealing piece, as a result of the loading by the energy accumulator acting through the valve spindle, bears against its associated sealing seat and prevents further steam feed to the turbine.

In accordance with again another feature of the invention, the governing device which is connected to each electromagnetic coupling can bring about its de-energizing in such a way that the spontaneous closing of the relevant valve is effected.

With the objects of the invention in view, there is also provided a method of actuating a valve for a steam turbine, which comprises initially energizing the electromagnetic coupling for producing a rotationally locked connection between the electric drive motor and the threaded bush; activating the electric drive motor for rotating the threaded bush and axially moving the valve spindle held therein together with the sealing piece disposed on the valve spindle relative to the associated sealing seat; charging the energy accumulator simultaneously with the axial movement of the spindle; de-energizing the electromagnetic coupling when a given operating state exists, such as a requisite initiation of a turbine emergency stop; and releasing a rotary restraint for the threaded bush and loading the valve spindle together with the sealing piece disposed thereon against the sealing seat under the action of an axial force released from the loaded energy accumulator, for interrupted steam feed to the steam turbine.

Thus far the mode of operation of the valve according to the invention in the case of normal operation is envisaged.

If one of the initiating conditions for turbine emergency stop or comparable special operating states exists, the electromagnetic coupling is de-energized, that is its current supply is interrupted, as a result of which the rotary restraint for the threaded bush is released and the valve spindle together with the sealing piece disposed thereon is loaded against the sealing seat of the valve under the action of the axial force released from the charged energy accumulator, so that the steam feed to the steam turbine is interrupted.

Other features which are considered as characteristic for the invention are set forth in the appended claims.

Although the invention is illustrated and described herein as embodied in a valve for a steam turbine and a method of actuating the valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is an elevational view of a medium-actuated emergency-stop valve having a 3-way valve as a pilot-control valve with the drive according to the invention;

FIG. 3 is an enlarged, longitudinal-sectional view of a portion contained within a circle in FIG. 2.

DESCRIPTION OF THE PREFERRED EMBODIMENTS

Figure 1:
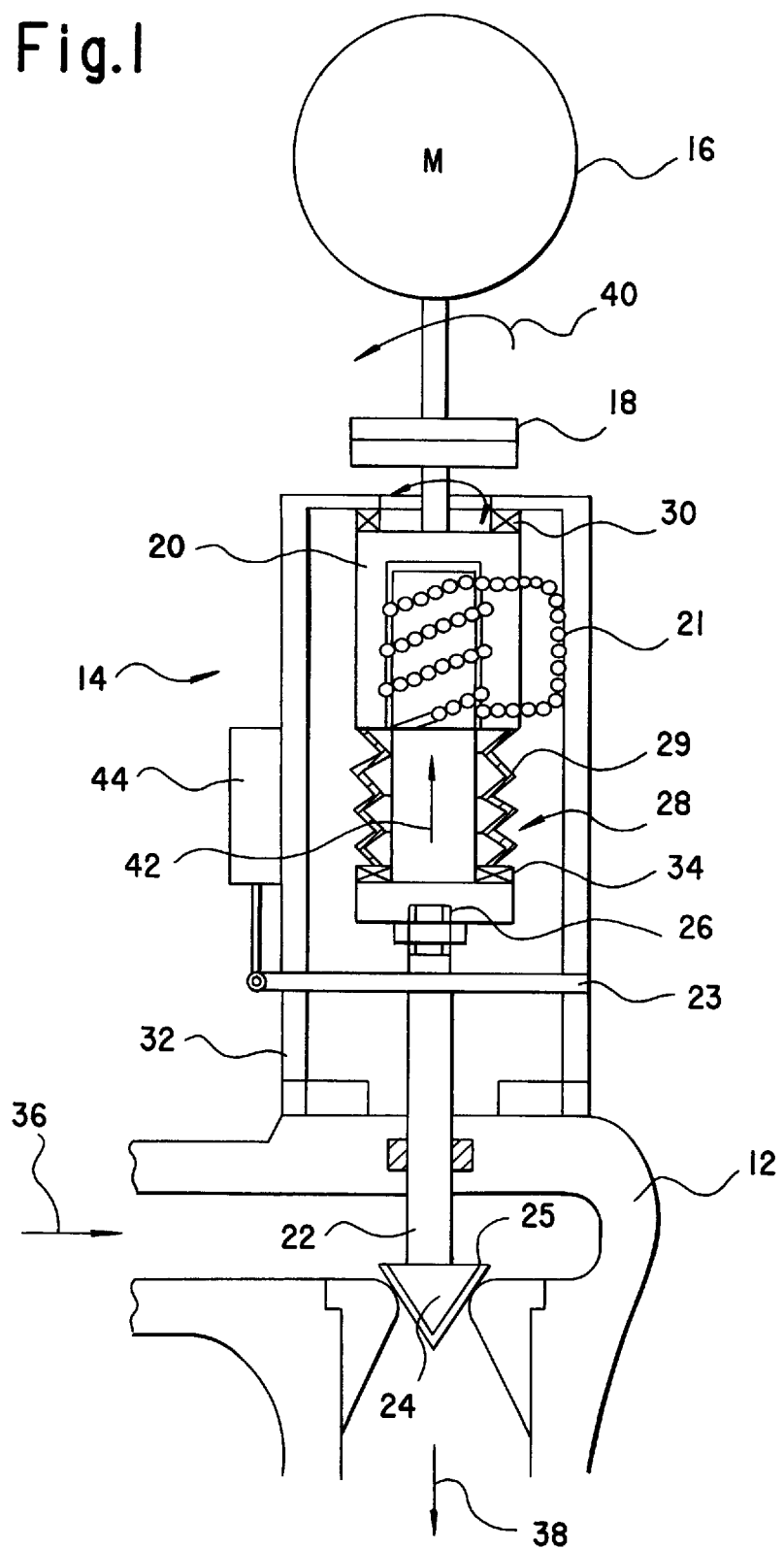
FIG. 1 is a fragmentary, diagrammatic, longitudinal-sectional view of a valve with drive.

Referring now to the figures of the drawing in detail and first, particularly, to FIG. 1 thereof, there is seen a valve 10 for a steam turbine which includes a valve housing 12 and a drive 14. The drive 14 has an electric drive motor 16 which acts through an electromagnetically actuated coupling 18 and an intermediately disposed threaded bush 20, upon a spindle 22. The spindle has a side facing away from the drive 14 on which a sealing piece 24 that is constructed as sealing cone, is disposed. The valve spindle 22 is guided in a rotationally fixed manner through the use of an anti-rotation locking device 23 and is rigidly connected to a threaded clamping piece 26 which is in engagement with the threaded bush 20.

In the illustrated exemplary embodiment, the threaded bush 20 is constructed as a ballscrew bush having ball circulation 21 in order to keep friction force exerted on the lateral surfaces of the thread as small as possible. An energy accumulator 28, which is formed from alternately placed disc springs 29, is disposed between the threaded bush 20 and the region of the threaded clamping piece 26 adjoining the spindle 22. In order to keep down friction forces occurring under load during the rotation of the threaded bush 20, on one hand the threaded bush 20 is supported axially with a rolling bearing 30 on a valve cap 32 and on the other hand the energy accumulator 28 is supported in a further rolling bearing 34 on the threaded clamping piece 26.

The mode of operation of the valve block shown in FIG. 1 is as follows. Steam flows to the valve housing 12 in accordance with an arrow indicated by reference numeral 36. The illustrated position of the valve 10 in FIG. 1 is a closed position so that no steam can flow through between the sealing piece 24 and a sealing seat 25 associated with it in the direction of an arrow indicated by reference numeral 38. The threaded bush 20 is set in uniform rotary motion in accordance with an arrow 40 by actuation of the drive motor 16 acting through the electromagnetic coupling 18. As a result of the rotary motion, the threaded clamping piece 26 and thus the valve spindle 22 connected thereto are moved upwards in accordance with an arrow 42, that is in the direction of the electromagnetic coupling 18. The energy accumulator 28 that is located between the threaded clamping piece 26 and the threaded bush 20, that is the spring assemblies which are disposed there and are formed of the disc springs 29, is thereby compressed at the same time and loaded in this way. In the process, the sealing piece 24 is lifted from the sealing seat 25 so that the steam flowing in on the left-hand side into the valve housing 12 in accordance with the arrow 36 flows through the latter and leaves it at the arrow 38.

In the event of a load release and a turbine emergency stop brought about thereby, the electromagnetic coupling 18 is likewise separated from the power supply and in this way is de-energized so that the axial force coming from the energy accumulator is indirectly exerted on the spindle 22 through the threaded clamping piece 26. A rotary restraint which is exerted during normal operation on the thread turns in the threaded clamping piece 26 due to the rotatably disposed threaded bush 20 is neutralized so that the threaded bush 20 is set in rotation, while at the same time the threaded clamping piece 26 moves downwards against the direction of the arrow 42, and in the process loads the spindle 22 with the sealing piece 24 against the sealing seat 25.

For certain positioning cases in which an exact position of the sealing piece 24 is to be maintained, a laterally disposed stroke-measuring device 44 is used, for exactly comprehending or predetermining the actuating travel of the spindle 22.

A medium-actuated emergency-stop main valve 46 for a non-illustrated steam turbine is shown in FIG. 2. The emergency-stop main valve 46 is fluidically connected to a so-called pilot-control valve 48. The pilot-control valve 48 is constructed as a 3-way valve with two feed lines or ports 50, 52 being run to and away from the main valve 46 and a third port 54 being run to a non-illustrated low-pressure space. Apart from the fact that the pilot-control valve 48 has a valve housing 56 differing from the representation in FIG. 1 as is shown in an enlarged view in the longitudinal section of FIG. 3, in principle it has the same drive 14 as the valve 10 shown in FIG. 1. Accordingly, the same reference numerals are used for the same parts.

The function of the pilot-control valve 48 that is constructed as a 3-way valve is explained below in more detail with reference to the sectional detailed representation thereof shown in FIG. 3. In a working position of the pilot-control valve 48 which is shown in FIG. 3, a connection between the ports 50 and 52 is interrupted by the sealing piece 24, while live steam flowing in from the main valve 46 through the port 52 can escape through the port 54 to the non-illustrated low-pressure space.

In the event of a response, that is if a turbine emergency stop is initiated, a de-energizing of the electromagnetic coupling 18 is effected, as a result of which the valve spindle 22 is driven into its rest position, that is to the left as shown in FIG. 3, due to the loading by the energy accumulator 28. In the energized state, the sealing piece 24 is likewise displaced to the right and thereby produces a connection between the ports 50 and 52 on one hand and at the same time shuts off the connection to the low-pressure space through the port 54 on the other hand. The working medium, normally steam, flowing through the ports 50, 52 leads to the immediate closing of a non-illustrated closing member located in the main valve 46. In order to open this closing member, it is sufficient to again shut off the connection between the ports 50 and 52 so that the live steam flowing in through the port 52 again flows off to the low-pressure space through the port 54.

Figure 4:
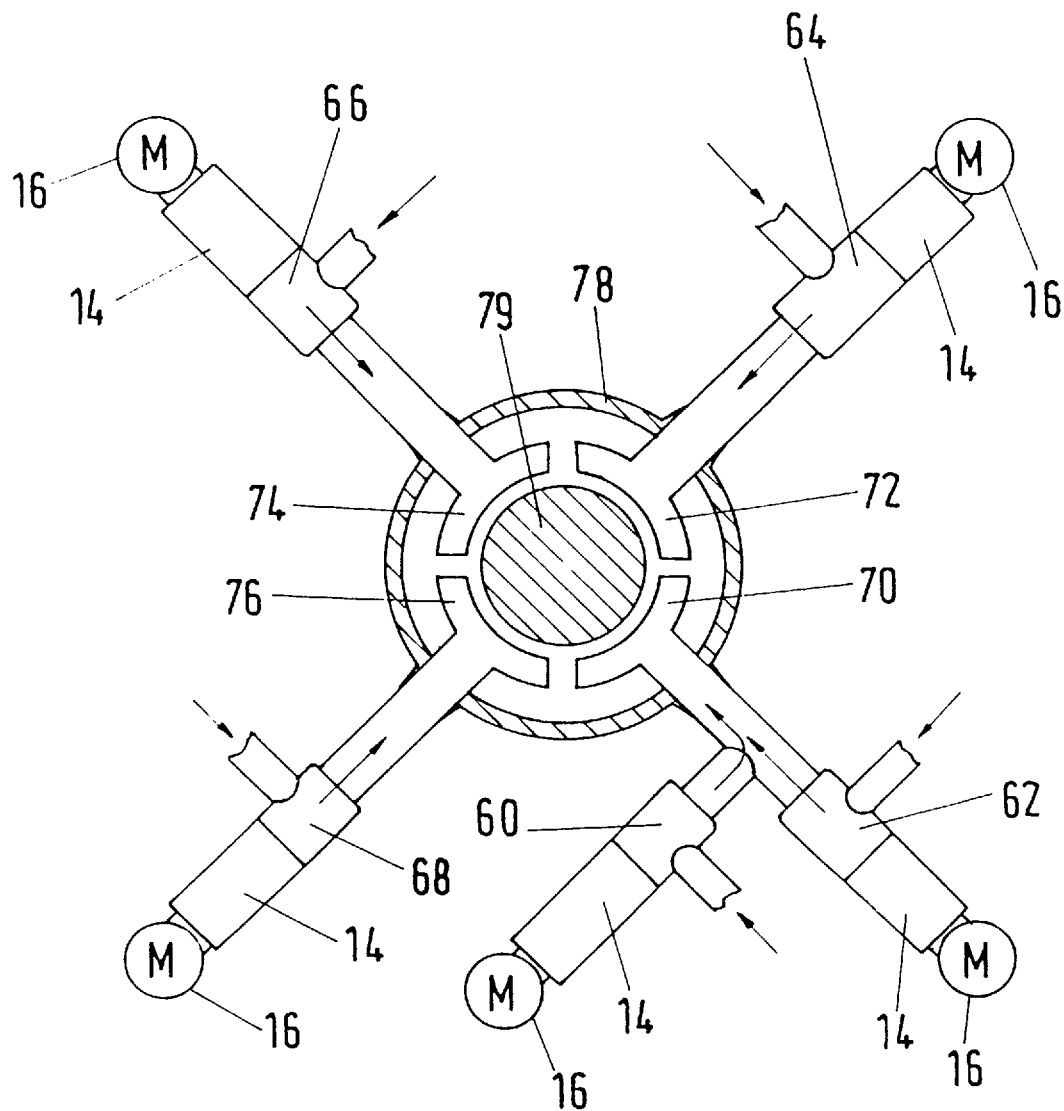
FIG. 4 is a fragmentary, cross-sectional view of a steam turbine having governing valves allocated to individual nozzle groups.

FIG. 4 shows a configuration of several, namely first through fifth, governing valves 60, 62, 64, 66, 68 which are allocated to first through fourth nozzle groups 70, 72, 74, 76 of a steam turbine 78 shown diagrammatically in cross-section and having a central rotor 79. The mode of action of this governing-valve configuration is explained below.

In order to provide for the satisfactory function of the governing valves, an increase in a closing speed alone is not sufficient to perform the requisite functions. It is also not desirable in every case to interrupt the steam feed to the turbine 78 completely, that is to close all of the governing valves 60 to 68 completely, for example in the operating state of a partial-load release.

In such cases it becomes necessary to distribute the live-steam mass flow over a plurality of valves or valve groups and to maintain the requisite rates of change for the steam mass flow in both the closing direction and the opening direction by feedforward control or through the use of selection logic and deviation-dependent reversals. Since in most operating states a fully modulated first nozzle group for an auxiliary service power would lead to overstressing of a governing-wheel blade, the five governing valves 60 to 68 are provided in the present case, with the first nozzle group 70 being supplied by two valves 60, 62. The first valve 60 in this case is constructed for the steam quantity in accordance with the auxiliary service power, whereas the second valve 62 is used for a residual steam quantity for the full modulation of the first nozzle group 70. The three remaining valves 64, 66, 68 are adapted to the assigned nozzle groups 72, 74, 76 in a known manner.

During starting of the turbine 78, selection logic ensures that only the first valve 60 can be activated by a non-illustrated turbine governor as long as the non-illustrated generator which is acted upon by the turbine 78 is not synchronized with the supply network. In this way, the starting time of the turbine is increased and satisfactory speed governing of the turbine 78 can be realized with the normal motor actuating speed of the actuating drives 14 provided in this case. After the turbine 78 is synchronized, its rotational speed is determined by the network frequency, and the further loading and if need be load maneuvers required later are effected comparatively slowly, so that the normal motor actuating speed of the drive 14 is completely sufficient.

Upon load release, that is upon separation from the network, for example due to auxiliary service, the de-energizing of the magnetic coupling located at the drives 14 of the valves 62, 64, 66, 68, that is the interrupting of its current supply, is effected through the use of a signal from a non-illustrated circuit-breaker auxiliary contact, which spontaneously leads to the closing of these valves 62, 64, 66, 68. An otherwise excessive increase in rotational speed can thereby be reliably avoided. In this case, the valve 60 provided for the auxiliary service supply already has the correct position, and the speed governor for the turbine can then take over the fine regulation through the auxiliary service valve 60.

Should a full-load disconnection become necessary, for example by opening of a generator switch, the auxiliary service valve 60 must also be closed as quickly as possible in addition to the load valves 62, 64, 66, 68 so that the speed governor of the turbine 78 performs its function when the auxiliary service valve 60 is closed for the time being.

If circumstances should arise during normal operation which lead to a deviation that is greater than can be absorbed by the auxiliary service valve 60, due to the relatively low motor actuating speed of the drives 14 of the governing valves 60, 62, 64, 66, 68, a change-over of the valves 60 to 68 from series activation to parallel activation of individual valves or of all five valves is provided. In this way, the rate of change for the steam mass flow can be increased up to five-fold, so that the deviation which has occurred can be compensated for again very quickly and the turbine speed returns to the normal range. The valves 60 to 68 can then be re-set again to series control. Likewise, in the event of a deviation which acts in the closing direction, the magnetic coupling can be de-energized at the drives in question in order to close the relevant governing valve quickly.

In impulse turbines without nozzle groups disposed upstream, a corresponding procedure is used, but in that case, instead of an auxiliary service valve being provided in a suitable manner, two valves of different size are provided, one of which could be adapted to lowered live-steam data and the other could be adapted to maximum live-steam data.

The valve drives dealt with above can also be used advantageously in bypass and reducing valves, to be precise on both the steam side and the water side, if a safety position has to be reached automatically in the event of the auxiliary power failing.

In addition, provision can be made for short-time interruptions of the motor voltage or the current supply to be bridged, through the use of buffer batteries for the supply of the electromagnetic coupling, without disconnection of the turbine. During parallel operation this results in an increase in availability without restrictions for the safety of the turbine.

I claim:
1. A valve for a steam turbine, comprising:
   a valve housing having a sealing seat disposed therein;
   a sealing piece interacting with said sealing seat;
   a valve spindle for actuating said sealing piece;
   a drive for actuating said valve spindle, said drive including an energy accumulator, an electromagnetic coupling, and an electric motor interacting with said valve spindle through said electromagnetic coupling and acting upon said energy accumulator; and
   a threaded bush connected to said electromagnetic coupling, interacting with said valve spindle and guided in a rotationally locked manner for axially moving said valve spindle.

2. The valve according to claim 1, wherein said threaded bush is a ballscrew bush acting upon said valve spindle with little play and little friction.

3. The valve according to claim 1, wherein said energy accumulator is a spring accumulator.

4. The valve according to claim 3, wherein said energy accumulator is formed of disc springs.

5. The valve according to claim 1, wherein said valve spindle and said sealing piece are connected to one another.

6. The valve according to claim 1, wherein the valve is an emergency-stop valve, and said sealing piece is loaded against said sealing seat by said energy accumulator acting through said valve spindle, upon de-energizing said electromagnetic coupling.

7. A valve assembly, comprising:
   a medium-actuated emergency-stop main valve; and
   a pilot-control valve for said medium-actuated emergency-stop main valve, said pilot-control valve including:
      a valve housing having a sealing seat disposed therein;
      a sealing piece interacting with said sealing seat;
      an axially movable valve spindle for actuating said sealing piece; and
      a drive for actuating said valve spindle, said drive including an energy accumulator, an electromagnetic coupling, and an electric motor interacting with said valve spindle through said electromagnetic coupling and acting upon said energy accumulator.

8. The valve assembly according to claim 7, wherein said pilot-control valve is a 3-way valve, and said sealing piece clears a flow path for a working medium when said eletromagnetic coupling is de-energized for acting upon a closing member in said main valve as a result of a loading by said energy accumulator acting through said valve spindle.

9. A valve assembly, comprising:
   a plurality of valves of a given type, one of said valves being a governing valve, and at least one other of said valves being combined with said governing valve, each of said valves including:
      a valve housing having a sealing seat disposed therein;
      a sealing piece interacting with said sealing seat;
      an axially movable valve spindle for actuating said sealing piece; and
      a drive for actuating said valve spindle, said drive including an energy accumulator, an electromagnetic coupling, and an electric motor interacting with said valve spindle through said electromagnetic coupling and acting upon said energy accumulator.

10. The valve according to claim 9, wherein said electric drive motor and said electromagnetic coupling of each valve are connected to a common electric or electronic governing device.

11. The valve assembly according to claim 9, wherein said plurality of valves include at least five valves of the given type, one of said valves being a basic governing valve, and each of the other of said valves being associated with a respective nozzle group of a steam turbine as load valves.

12. A method of actuating a valve for a steam turbine including a valve housing having a sealing seat disposed therein; a sealing piece interacting with the sealing seat; a valve spindle for actuating the sealing piece; and a drive for actuating the valve spindle, the drive including an energy accumulator, an electromagnetic coupling, an electric motor interacting with the valve spindle through the electromagnetic coupling and acting upon the energy accumulator, and a threaded bush connected to the electromagnetic coupling, interacting with the valve spindle and guided in a rotationally locked manner for axially moving the valve spindle, which comprises:

initially energizing the electromagnetic coupling for producing a rotationally locked connection between the electric drive motor and the threaded bush;

activating the electric drive motor for rotating the threaded bush and axially moving the valve spindle held therein together with the sealing piece disposed on the valve spindle relative to the associated sealing seat;

charging the energy accumulator simultaneously with the axial movement of the spindle;

de-energizing the electromagnetic coupling when a given operating state exists; and releasing a rotary restraint for the threaded bush and loading the valve spindle together with the sealing piece disposed thereon against the sealing seat under the action of an axial force released from the loaded energy accumulator, for interrupted steam feed to the steam turbine.

13. The method according to claim 12, which comprises de-energizing the electromagnetic coupling upon a requisite initiation of a turbine emergency stop as the given operating state.

14. The method according to claim 12, which comprises actuating the valve as a turbine emergency-stop valve.

15. The method according to claim 12, which comprises actuating the valve as a pilot-control valve for a medium-actuated turbine emergency-stop valve.

16. The method according to claim 12, which comprises actuating the valve as a turbine governing valve.

* * * * *